United States Patent
Miyamoto

(10) Patent No.: US 8,030,811 B2
(45) Date of Patent: Oct. 4, 2011

(54) STATOR AND GAP WINDING MOTOR USING THE SAME

(75) Inventor: Takashi Miyamoto, Fukuoka (JP)

(73) Assignee: Kabushiki Kaisha Yaskawa Denki, Kitakyushu-shi, Fukuoka (JP)

(*) Notice: Subject to any disclaimer, the term of this patent is extended or adjusted under 35 U.S.C. 154(b) by 198 days.

(21) Appl. No.: 12/059,880

(22) Filed: Mar. 31, 2008

(65) Prior Publication Data

US 2008/0238226 A1     Oct. 2, 2008

(30) Foreign Application Priority Data

Mar. 30, 2007    (JP) .................. 2007-095444

(51) Int. Cl.
  *H02K 11/00*   (2006.01)
  *H02K 19/00*   (2006.01)
  *H02K 1/12*    (2006.01)
(52) U.S. Cl. ....... 310/71; 310/67 R; 310/164; 310/254.1
(58) Field of Classification Search ........... 310/71, 310/67 R, 164, 254.1
  See application file for complete search history.

(56) References Cited

U.S. PATENT DOCUMENTS

| | | | |
|---|---|---|---|
| 5,532,533 A * | 7/1996 | Mizutani | 310/68 B |
| 6,285,107 B1 * | 9/2001 | Sawada et al. | 310/216.001 |
| 7,135,793 B2 * | 11/2006 | Seguchi et al. | 310/71 |

FOREIGN PATENT DOCUMENTS

| | | | |
|---|---|---|---|
| JP | 02250650 A | * | 10/1990 |
| JP | 7-249843 A | | 9/1995 |
| JP | 9-285056 A | | 10/1997 |
| JP | 09285056 A | * | 10/1997 |
| JP | 11275813 A | * | 10/1999 |
| JP | 2000-333395 A | | 11/2000 |
| JP | 2005151719 A | * | 6/2005 |
| JP | 2005269765 A | * | 9/2005 |

OTHER PUBLICATIONS

Derwent Translation Text JP02250650 (1990).*
Machine Translation JP09285056 (1997).*
Machine Translation JP11275813 (1999).*
MAchine translation JP2005151719 (2005) and JP2005269765 (2005).*

* cited by examiner

*Primary Examiner* — Quyen Leung
*Assistant Examiner* — Jose Gonzalez Quinones
(74) *Attorney, Agent, or Firm* — Westerman, Hattori, Daniels & Adrian, LLP

(57) ABSTRACT

A so-called gap winding motor capable of preventing a rotation detector from being affected by noise generated by a stator coil connection portion and decreasing the size and cost is provided. The gap winding motor comprises a stator including a stator core, a plurality of stator coils arranged on an inner peripheral surface of the stator core, a ring-shaped coil connection board configured to connect the plurality of stator coils, and ring-shaped shield patterns provided at both surfaces of the ring-shaped coil connection board. The stator core, the coil connection board, and the shield patterns are encapsulated with resin, and a rotation detector mounting printed circuit board is arranged in a gap located at an inner side of the stator core.

9 Claims, 4 Drawing Sheets

US 8,030,811 B2

STATOR AND GAP WINDING MOTOR USING THE SAME

RELATED APPLICATIONS

This application claims priority under 35 U.S.C. §119 to Japanese Patent Application No. 2007-095444 filed on Mar. 30, 2007. The entire disclosure of the application is incorporated herein by reference in its entirety.

BACKGROUND OF THE INVENTION

1. Field of the Invention

The present invention relates to a stator for a flat armature winding type brushless DC motor, the so-called gap winding type electric motor, for use in FA (Factory Automation) and OA (Office Automation), and the gap winding type electric motor using the stator.

2. Description of Related Art

The following description sets forth the inventor's knowledge of related art and problems therein and should not be construed as an admission of knowledge in the prior art.

In a conventional electric motor, a rotation detector is arranged at a position sufficiently distant from the motor electromagnetic portion. For example, such a rotation detector is attached to the non-load side bracket of the motor so as to be away from and opposite to the motor electromagnetic portion.

FIG. 4 shows a schematic cross-sectional view of a conventional motor taken along the vertical plane passing through the motor shaft. In FIG. 4, the reference numeral 41 denotes a stator, 42 denotes a rotor, 43 denotes a frame, 44 denotes a rotation detector printed circuit board, 45 denotes a bracket, 46 denotes a bracket, and 47 denotes a detector cover.

The stator 41 is formed by arranging a plurality of concentrated winding coils in the stator core at regular intervals and sealing the coils and wire connection portions with resin. This stator 41 is inserted in and fixed to the frame 43 with brackets 45 and 46 attached to the ends of the frame 43. The reference numeral 44 denotes a rotation detector printed circuit board arranged at the side of the non-loaded side bracket 45.

The frame 43 is made from a conductive material such as, e.g., iron and grounded via an external wiring. The frame 43 and the brackets 45 and 46 are electrically connected with each other to avoid leaking switching noise generated from the coil connection portion.

As discussed above, in a conventional motor, the rotation detector printed circuit board 44 is arranged outside the stator 41 as a noise prevention measure.

As such a noise prevention measure, it is also known to shield the rotation detector printed circuit board as disclosed by Japanese Unexamined Laid-open Patent Publication No. 2000-333395. However, this document is directed to a special type of a stator which easily generates noise. Specifically, in this stator, a multilayer printed circuit board is arranged at the axial end of the stator core of the motor, and wires are wound on the stator core and the multilayer printed circuit board, in a toroidal manner. In this structure, it is inevitable to shield the rotation detector printed circuit board.

On the other hand, there is another type of motor in which concentrated winding coils are arranged on the inner peripheral surface of the stator core at regular intervals, and the multilayer printed circuit board is not wound by the concentrated winding coils. In other words, the multilayer printed circuit board and the concentrated winding coils are not closely arranged. Thus, the printed circuit board is not required to be shielded as taught by the aforementioned Patent Document.

As the noise prevention measure, it is sufficient to ground the bracket to prevent the rotation detector printed circuit board 44 from being affected by noise generated from a stator coil connection portion.

Specifically, as illustrated in FIG. 4, the rotation detector printed circuit board 44 is arranged at the external side of the non-load side bracket 45. The frame 43 is electrically connected to both the brackets 45 and 46, the frame 43 and the brackets 45 and 46 being made of a conductive material such as, e.g., iron. The frame 43 is grounded via an external wiring. Thus, the leaking of switching noise can be prevented.

As explained above, in a conventional motor of this type, since the rotation detector printed circuit board 44 is arranged outside the stator 41, it was difficult to reduce the size of the motor and decrease the number of constituent parts, resulting in increased cost.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

Preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a stator capable of reducing the size and cost thereof while preventing a rotor detector from being affected by noise generated from a stator coil connection portion.

Among other potential advantages, some embodiments can provide the so-called gap winding motor capable of reducing the size and cost thereof while preventing a rotor detector from being affected by noise generated from a stator coil connection portion.

According to a first aspect of the present invention, a stator, comprises: a stator core, a plurality of non-core stator coils arranged on an inner peripheral surface of the stator core, a ring-shaped coil connection board configured to connect the plurality of stator coils, and a ring-shaped shield patterns provided at both surfaces of the ring-shaped coil connection board.

In this stator, since the ring-shaped shield patterns are provided at both surfaces of the ring-shaped coil connection board, noise generated from the coil connection board can be shielded, enabling the rotation detector to be disposed more closely to the coil connection board, which in turn can reduce the size of the motor in the axial direction.

In some examples, in cases where a plurality of the ring-shaped coil connection boards are laminated, each of the plurality of the ring-shaped coil connection boards is provided, at both surfaces, with the ring-shaped shield patterns. In this stator, since each of the plurality of the ring-shaped coil connection boards is provided at both surfaces with the ring-shaped shield patterns, electric charges generated in the shield patterns can be prevented from being discharged to other coils. This prevents deterioration and damages of the coils.

In some examples, the stator core, the stator coils, and the coil connection board are encapsulated with resin. In this stator, since these parts are encapsulated with resin, the shield patterns can be prevented from being shifted and handled as one part, resulting in enhanced fabrication and improved productivity.

In some examples, the shield patterns are grounded. In this stator, since the shield patterns are grounded, accumulation of electric charges in the shield patterns would not occur, eliminating discharging of electric charges, which in turn can prevent deterioration and damages to the parts.

In some examples, the coil connection board is arranged at either side of the stator core in a rotational shaft direction. In this case, since the coil connection board is arranged in a conventionally dead space located at one end of the rotation shaft of the stator core, the motor can be reduced in size.

According to a second aspect of the present invention, a gap winding motor, comprises: any one of the aforementioned stators, and a rotor provided with a plurality of permanent magnets on an external peripheral surface of the rotor, the plurality of permanent magnets being disposed so as to face against the stator coils via a gap.

In this case, a gap winding motor which does not leak noise can be obtained.

In some examples, the gap winding motor further comprises a rotation detector arranged in a gap located at an inner side of the ring-shaped coil connection board. In this motor, since the rotation detector is arranged in a gap located at an inner side of the ring-shaped coil connection board, a gap winding motor which is noise-tolerant and reduced in size, can be obtained.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some embodiments of the invention will be described by way of example and not limitation. It should be understood based on this disclosure that various other modifications can be made by those in the art based on these illustrated embodiments.

Hereinafter, an embodiment of the present invention will be explained with reference to the attached drawings.

Figure 1:
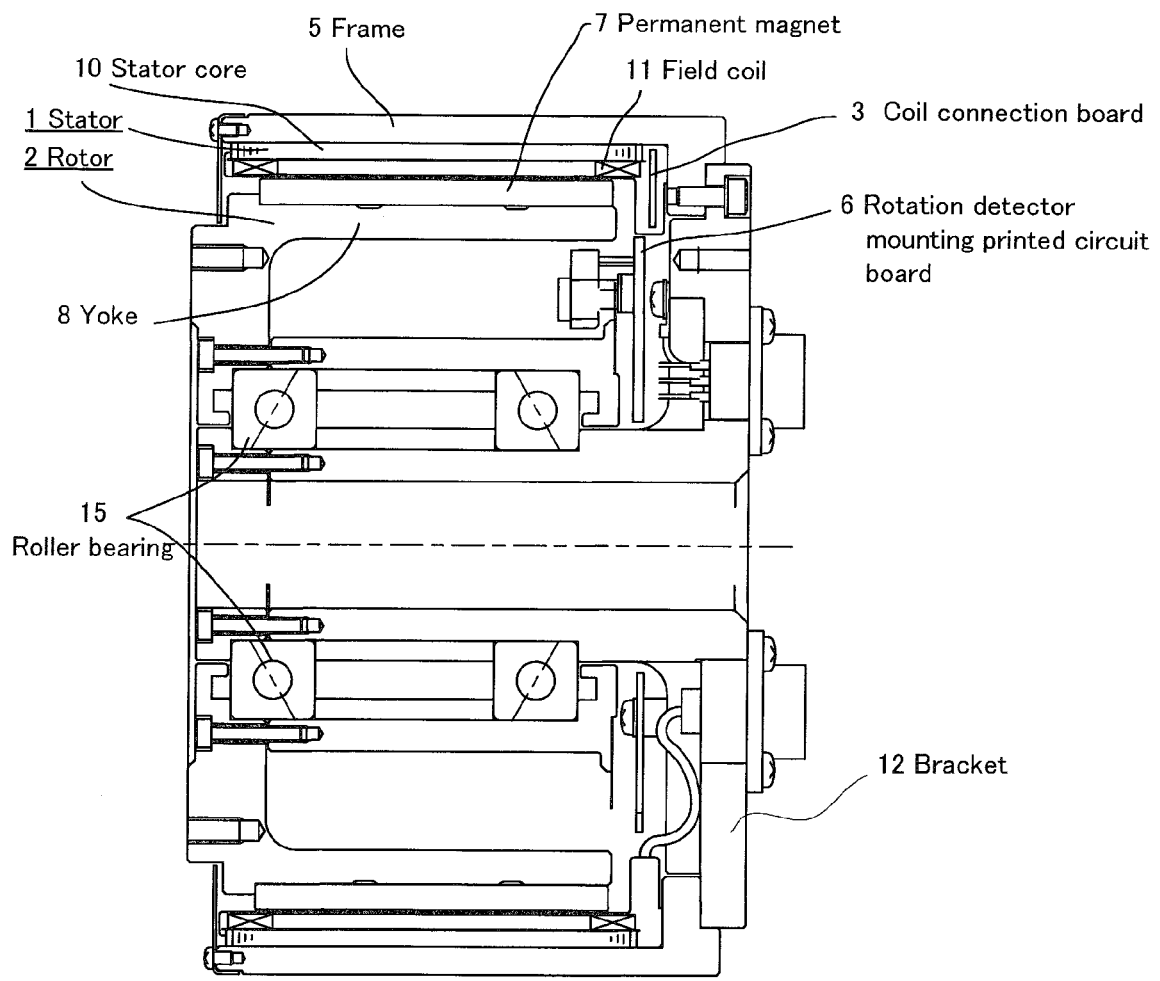
FIG. 1 is a vertical schematic cross-sectional view of the so-called gap winding motor taken along the plane passing through the motor shaft according to an embodiment of the present invention.

FIG. 1 is a vertical schematic cross-sectional view showing the so-called gap winding motor according to an embodiment of the present invention. FIG. 1 shows the positional relation of a stator 1, a coil connection board 3 arranged within the stator 1, and a rotation detector mounting printed circuit board 6. This motor includes the stator 1 and a rotor 2 rotatably supported at the inner side of the stator 1 via roller bearings 15. The rotor 2 is constituted by a yoke 8 having a cylindrical permanent magnet arranging surface and permanent magnets 7 arranged at equal intervals on the surface of the yoke 8 so as to face against field coils 11 via a magnetic gap.

The rotation detector mounting printed circuit board 6 is disposed in the inner space of the stator 1 so as to lie adjacent to the coil connection board 3.

Figure 2:
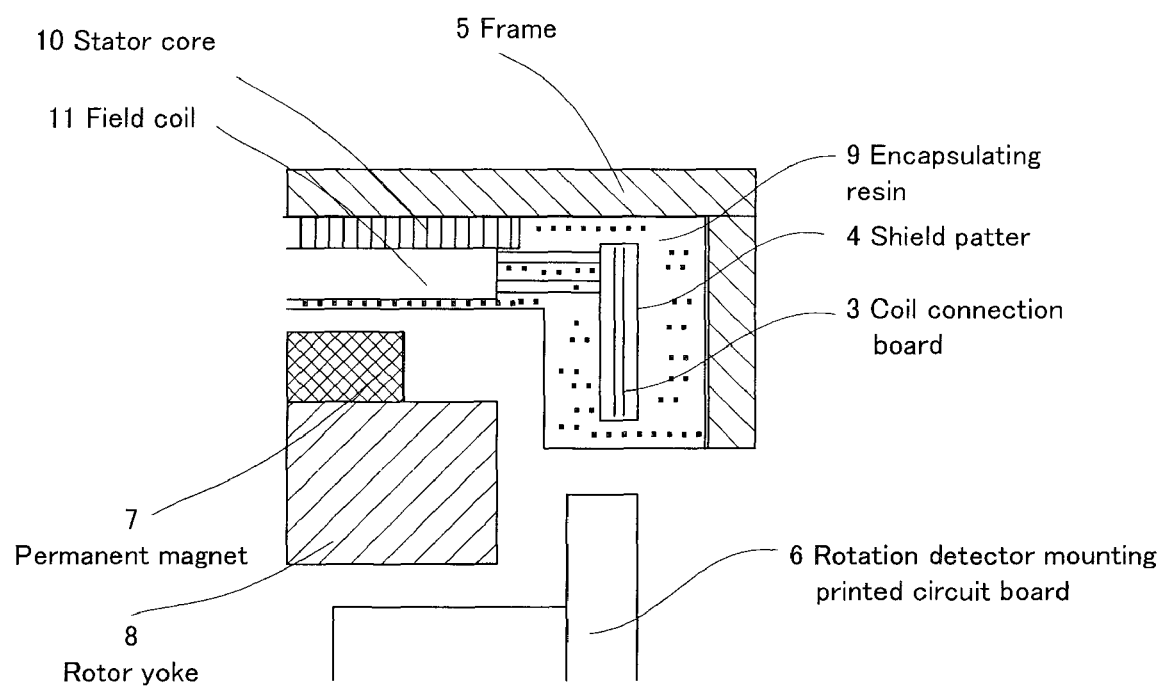
FIG. 2 is a partial schematic cross-sectional view showing the coil connection board and the vicinity thereof according to the embodiment of the present invention.

FIG. 2 is an enlarged cross-sectional view showing the coil connection board 3 and the vicinity thereof In FIG. 2, the stator 1 is constituted by arranging a plurality of concentrated winding coils (field coils) 11 on the inner peripheral surface of the cylindrical stator core 10 at equal intervals and integrally encapsulating the coil connection board 3 connecting the coils 11 so as to generate revolving magnetic fields with encapsulating resin 9.

The rotation detector mounting printed circuit board 6 is disposed so as to be adjacent to the coil connection board 3 with the encapsulating resin 9 intervening between them. The coil connection board 3 is provided, at both its surfaces, with shield patterns 4. The shield patterns 4 are grounded via wires 4a (see FIG. 3).

Figure 3:
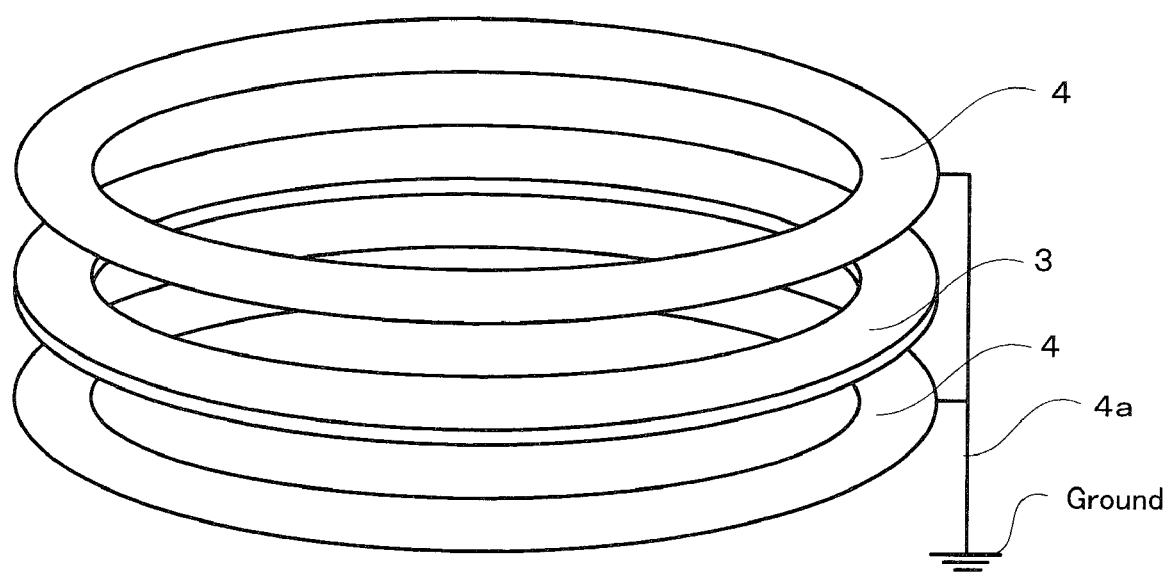
FIG. 3 is a schematic exploded view showing one unit of the coil connection board of the embodiment.
Figure 4:
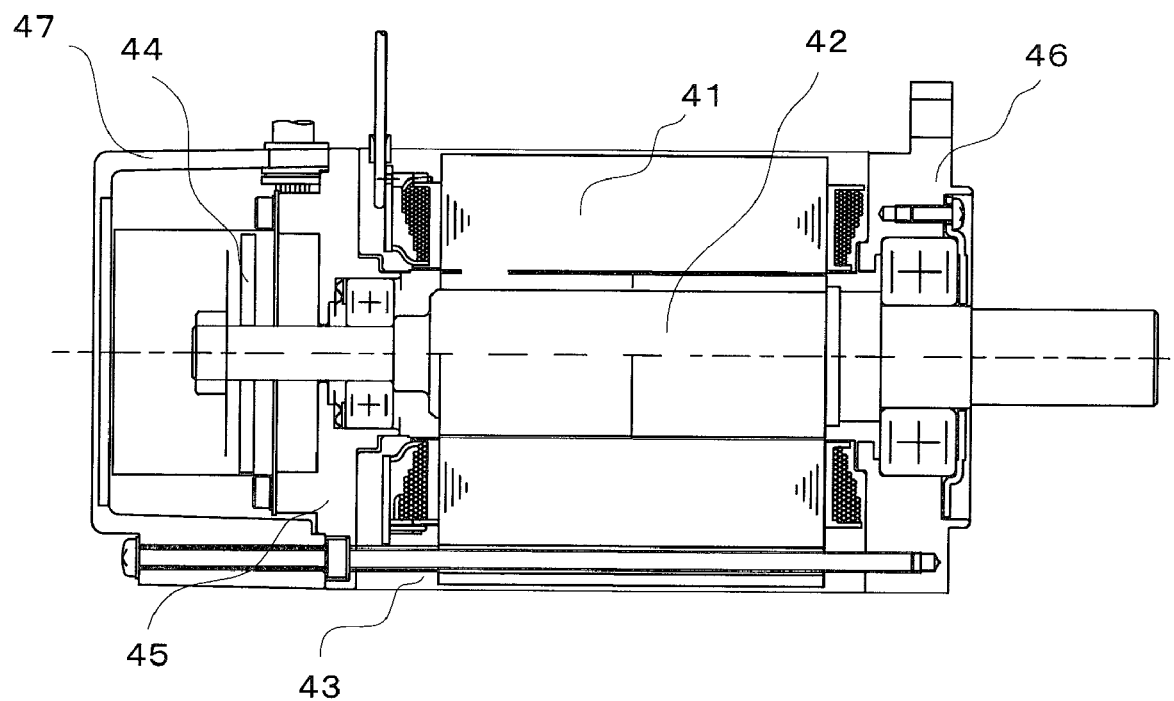
FIG. 4 is a vertical schematic cross-sectional view of a conventional gap winding motor taken along the plane passing through the motor shaft.

FIG. 3 is an exploded view of a single unit of the coil connection board 3.

As will be understood from FIG. 3, shield patterns 4 are formed on both surfaces of the coil connection board 3 having a coil connection pattern, and the shield patterns 4 are grounded via the grounding wire 4a to discharge the electric charges generated in the coils 11.

In cases where plural units of the coil connection boards 3 are laminated in a multilayered manner, it is preferable not to shield the entirety of the multilayered structure but to shield both surfaces of each unit of the coil connection board 3. This prevents discharging of electric charges generated in each shield pattern 4 to other coils 11, which in turn can prevent deterioration and damages of the coils 11.

Pulse width modulation (PWM) noise emitted from the coil connection board 3 of the stator 1 is shielded by the shield patterns 4 formed on the coil connection board 3, which prevents effects of the noise on the rotation detector printed circuit board 6. This makes it possible to arrange the rotation detector mounting printed circuit board 6 more closely to the coil connection board 3, enabling miniaturization of the motor.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A stator for a gap winding motor, comprising:
   a cylindrical stator core having an inner peripheral smooth surface;
   a plurality of stator coils, which are air core concentrated winding coils, arranged on the inner peripheral smooth surface of the cylindrical stator core at regular intervals, fitting inside the cylindrical stator core;
   a ring-shaped coil connection board configured to connect the plurality of stator coils;
   ring-shaped shield patterns provided at both surfaces of the ring-shaped coil connection board; and
   a rotation detector mounting printed circuit board arranged in a space formed by an inner cylindrical surface of the ring-shaped coil connection board.

2. The stator as recited in claim 1, wherein in cases where a plurality of the ring-shaped coil connection boards are laminated, each of the plurality of the ring-shaped coil connection boards is provided, at both its surfaces, with the ring-shaped shield patterns.

3. The stator as recited in claim 1, wherein the stator core, the stator coils, and the coil connection board are encapsulated with resin.

4. The stator as recited in claim 1, wherein the shield patterns are grounded.

5. The stator as recited in claim 1, wherein the coil connection board is arranged at either side of the stator core in a rotational shaft direction.

6. A gap winding motor, comprising:
   a stator as recited in claim 1; and
   a rotor provided with a plurality of permanent magnets on an external peripheral surface of the stator, the plurality of permanent magnets being disposed so as to face against the stator via a gap.

7. The gap winding motor as recited in claim 6, further comprising a rotation detector arranged in a gap located at an inner side of the ring-shaped coil connection board.

8. The gap winding motor as recited in claim 1, wherein the rotation detector mounting printed circuit board is arranged inside the stator.

9. The stator as recited in claim 1, wherein the rotation detector mounting printed circuit board is located between the cylindrical stator core and an outer surface of the ring-shaped coil connection board in an axial direction of the cylindrical stator core.

* * * * *